United States Patent
King (10) Patent No.: US 8,745,406 B2
(45) Date of Patent: Jun. 3, 2014

(54) PROGRAM EXECUTABLE IMAGE ENCRYPTION

(75) Inventor: Colin King, Crawley (GB)

(73) Assignee: Nytell Software LLC, Wilmington, DE (US)

( * ) Notice: Subject to any disclaimer, the term of this patent is extended or adjusted under 35 U.S.C. 154(b) by 1286 days.

(21) Appl. No.: 12/090,028

(22) PCT Filed: Oct. 10, 2006

(86) PCT No.: PCT/IB2006/053717
§ 371 (c)(1),
(2), (4) Date: Dec. 30, 2008

(87) PCT Pub. No.: WO2007/063433
PCT Pub. Date: Jun. 7, 2007

(65) Prior Publication Data
US 2009/0232304 A1 Sep. 17, 2009

(30) Foreign Application Priority Data

Oct. 17, 2005 (EP) .................................. 05109642

(51) Int. Cl.
*G06F 12/02* (2006.01)
*G06F 21/12* (2013.01)
*G06F 21/14* (2013.01)

(52) U.S. Cl.
CPC .............. *G06F 21/125* (2013.01); *G06F 12/02* (2013.01); *G06F 21/14* (2013.01)
USPC ........... 713/189; 713/164; 713/165; 713/166; 713/167; 713/190; 713/191; 717/100; 717/127; 717/140

(58) Field of Classification Search
CPC ........ G06F 21/125; G06F 21/14; G06F 12/02
USPC .......... 713/164–167, 189–191; 717/100, 127, 717/140
See application file for complete search history.

(56) References Cited

U.S. PATENT DOCUMENTS

| | | | | |
|---|---|---|---|---|
| 4,558,176 A | * | 12/1985 | Arnold et al. ................. | 713/190 |
| 6,185,686 B1 | * | 2/2001 | Glover .......................... | 713/190 |
| 6,205,580 B1 | * | 3/2001 | Hirose ......................... | 717/162 |
| 6,405,316 B1 | * | 6/2002 | Krishnan et al. ............. | 713/190 |
| 6,496,910 B1 | * | 12/2002 | Baentsch et al. ............. | 711/165 |
| 6,715,142 B1 | | 3/2004 | Saito et al. | |
| 6,802,006 B1 | * | 10/2004 | Bodrov ........................ | 713/187 |
| 7,254,586 B2 | * | 8/2007 | Chen et al. ................... | 713/190 |
| 7,757,097 B2 | * | 7/2010 | Atallah et al. ............... | 713/187 |

(Continued)

FOREIGN PATENT DOCUMENTS

| | | |
|---|---|---|
| EP | 0964370 A1 | 12/1999 |
| WO | 03090021 A2 | 10/2003 |

*Primary Examiner* — Yin-Chen Shaw
(74) *Attorney, Agent, or Firm* — McAndrews, Held & Malloy, Ltd.

(57) ABSTRACT

The invention provides for a method of encrypting and executing an executable image, comprising; flagging sections of the executable image to be encrypted using commands in source files and compiling said executable images so as to generate object files, linking one or more of said executable images using a linker to produce a final executable image, passing said linked executable images to a post-linker encryption engine to encrypt a relocation fix-up patch table and sections of executable images flagged for encryption, and at load time decrypting relocating and executing the executable images.

30 Claims, 5 Drawing Sheets

(56) References Cited

U.S. PATENT DOCUMENTS

| | | | |
|---|---|---|---|
| 7,757,224 B2* | 7/2010 | Forin et al. | 717/157 |
| 7,779,270 B2* | 8/2010 | Horning et al. | 713/187 |
| 2002/0138748 A1* | 9/2002 | Hung | 713/190 |
| 2003/0221116 A1* | 11/2003 | Futoransky et al. | 713/189 |
| 2004/0125954 A1 | 7/2004 | Riebe et al. | |
| 2005/0289266 A1* | 12/2005 | Illowsky et al. | 710/104 |
| 2011/0035733 A1* | 2/2011 | Horning et al. | 717/140 |

\* cited by examiner

PROGRAM EXECUTABLE IMAGE ENCRYPTION

The present invention relates to a method and system for encrypting and executing executable images. More specifically, it relates to a method and system for encrypting and loading executable image content.

Developing software requires considerable investment in terms of both time and finance and unauthorised use of software such as unauthorised copying or sharing ultimately results in loss of income for the software developer. Examples of unauthorised software can include copies made by third parties without obtaining the necessary authorization, or sharing of unauthorised copies through peer-to-peer networks. Such software may also include executable image or sound files which may also require protection from copying.

To implement such protection, it is well known to employ encryption measures to prevent unauthorised copies of software from being executed. Such measures typically involve encryption of one or more executable portions of the software which can prevent the software from running entirely, or to disable one or more individual functional features of the software so that the software runs sub-optimally. As an example, it is well known to encrypt executable program content prior to execution, and so as to protect implementations of algorithms contained therein. Examples of such executable content can include Codecs contained inside the program files such as the JPEG, MP3 and WMA formats typically used to compress image and sound files. Codecs can both transform the data into an encoded form (often for transmission, storage or encryption) and retrieve, or decode that data for viewing or manipulation in a format more appropriate for the particular operation. Codecs are often used in video-conferencing and streaming media solutions.

As an example, US-A-2004/0125954, discloses a data encryption/decryption system which maintains in encrypted form data elements required by a software program. Software producers can select and encrypt one or more program data sections and/or text sections referred to as critical data elements within an executable program. In order to execute the software a user must obtain a license key in order to decrypt the critical data elements used by the program. By providing different license keys it is possible to provide different license options allowing a software producer or supplier to exercise control over levels of functionality of the program depending on the functions that are enabled by the license key provided.

However, the solution as provided in US-A-2004/0125954 results in slower processing speeds because decrypting the executable before the program image is executed consumes valuable processor cycles resulting in a less responsive system. Furthermore, critical data sections referred to in US-A-2004/0125954, apply to the program code itself, for example program data sections and text sections, and not to a program header which contains necessary information such as a fix-up table, which enables a program loader to relocate the program into a desired area of memory.

It is well known to use such encryption techniques in a special purpose computer system known as an embedded system. Embedded systems can include a microprocessor or microcontroller arranged to perform pre-defined tasks. In embedded systems such as those used in consumer electronics and automobiles, the components thereof are typically required to be small and inexpensive. Microprocessors with on-chip memory management unit (MMU) hardware tend to be complex and expensive, and as such are not typically employed for embedded systems which do not require such complexity. Within the processor, the MMU is responsible for protecting system resources from unwanted access and also providing the capability for handling virtual memory. To reduce such component costs in embedded systems it is well known to use so called 'MMU-Less' processors, an example of which is the Philips TriMedia media processor. However, when executable files are loaded onto a MMU-less processor, the executable file has to be relocated to the desired memory location before it can be executed.

Relocation of executable images can be achieved by using a relocation fix-up table to relocate the image to a new address in memory. The fix-up table, also known as a patch table allows the executable image to be modified so that it can be run at a desired location in memory. This process typically involves the individual steps of encrypting fix-up data, relocating the encrypted fix-up data and decrypting the fix-up data to produce the final fixed up executable image. However, the fixing-up or patching process can consume valuable processor cycles resulting in a slower operation of the processor. Decrypting and relocating the executable code as separate and distinct operations can prove a relatively time-consuming process. Therefore, completing these operations in less time by reducing the number of operations can serve to produce a faster loading, and more responsive system.

The present invention seeks to provide for a method and system for encrypting and executing executable images quickly and efficiently, having advantages over known such methods and systems.

According to one aspect of the invention there is provided a method of encrypting an executable image, comprising the steps of: flagging sections of the executable image to be encrypted using commands in source files and compiling said executable image so as to generate object files, linking one or more of said executable images using a linker to produce a final executable image, fix up processing further comprising the steps of passing said linked executable image to a post-linker encryption engine to encrypt a relocation fix-up patch table and sections of executable images flagged for encryption, such that at load time the executable image can be decrypted, relocated and executed.

In particular, the present invention seeks to prevent illegitimate use of executable files in a manner which overcome one or more of the above mentioned disadvantages and which in particular prevents illegitimate copying of executable files.

Advantageously, this allows that only the code requiring protection will be marked for encryption while less important code can be left unencrypted. By selecting only the code which requires protection executable content can be loaded more quickly whilst also providing for a more responsive system which is both cost effective and simple implement.

Preferably, the step of decrypting the fix-up table involves combining the steps of decryption and fix-up processing. Advantageously, such a combination of steps provides for an efficient use of memory space whilst further providing for a faster responding system.

Preferably the step of flagging sections to be encrypted comprises using a compiler or linker directive and naming said sections at the source level stage so that the linker can encrypt the sections at a link or post link stage.

Furthermore, by using the section renaming mechanism sections of object code can be marked to indicate whether the section is to be encrypted. Advantageously, this also serves to provide an efficient use of memory space whilst also providing a faster responding system.

According to a further aspect of the invention there is provided a system for encrypting an executable image, comprising a compiler arranged to flag sections of the executable image to be encrypted and compile said executable image so as to generate object files, a linker arranged to link one or more of said object files to produce a final executable image and further arranged to process a fix up table by passing said linked executable image to a post-linker encryption engine, wherein the post-linker encryption engine is arranged to encrypt a relocation fix-up patch table and sections of an executable image flagged for encryption, such that at load time the executable image can be decrypted, relocated and executed.

In particular, the present invention seeks to prevent illegitimate use of executable files in a manner which overcome one or more of the above mentioned disadvantages and which in particular prevents illegitimate copying of executable files.

Advantageously, this allows that only the code requiring protection will be marked for encryption while less important code can be left unencrypted. By selecting only the code which requires protection the system can be loaded more quickly whilst also providing for a more responsive system which is both cost effective and simple implement.

Preferably, the decryption means is arranged to decrypt the fix-up table at the same time as processing the fix-up table. Advantageously, this provides for an efficient use of memory space whilst further providing for a faster responding system.

Preferably, a compiler or a linker directive is arranged to flag sections to be encrypted and is further arranged to name said sections at a source level stage so that the linker can encrypt the flagged sections at either a link or a post link stage.

Furthermore, by using the section renaming mechanism sections of object code can be marked to indicate whether the section is to be encrypted. Advantageously, this allows that only the code requiring protection will be marked for encryption while less important code can be left unencrypted. By selecting only the code which requires protection the system can be loaded more quickly whilst also providing for a more responsive system which is both cost effective and simple implement.

The invention is described further hereinafter, by way of example only, with reference to the accompanying drawings, in which.

Executable images of a program contain section information and traditionally executable images have several components or sections, for example, a text component, forming the executable program code, a data component comprising space for initialised or un-initialised program static data, and a Block Storage Segment (BSS) component comprising a region allocated by the loader containing static data initialised to zero. The BSS is the memory mapping component containing the data allocated for a binary image at execution time. The more components in a system, the greater the granularity and the more flexible it is. Granularity refers to the extent to which a system contains separate components. For example, the Philips TriMedia C complier allows sections or components in a generated object file to be renamed after compile time and before the objects are linked into a final executable.

A complier such as a GNU GCC C compiler allows sections to be labelled at compile time using special C extensions, or at link time using linker files. With GNU GCC compiler sections can be given titles, other than the standard text, data and BSS titles used with TriMedia C compiler, with special compile time directives, for example, an inlined assembler directive section which specifies that code following the compiler directive is placed in object code with a specified section name. This is performed using special linker rename flags applied by the linker on the object file generated from the compiled C source code from the GNU GCC compiler. Using the section renaming mechanism, sections of the object code can be marked by a special naming convention to indicate whether the section is to be encrypted or not. Therefore for a large application only important code, for example code which is subject to patent or copyright protection, or which contains confidential information, need be marked for encryption, while the less important code, such as C libraries, can be left un-encrypted. Object code produced by a compiler is generally placed in marked sections. Traditionally for C UNIX or Linux system these sections are entitled text, data and bss, as discussed in more detail below. However, once the object code is named it is not possible to rename it so as to mark it for encryption.

In overview, the present invention provides a method and system for encrypting and executing executable images where the executable image of a program is relocatable to a memory location for processing using a device such as a fix-up table. A fix-up table contains a list of pointers to addresses containing relative addresses. When the file is loaded into memory, the compiler goes to each of the addresses having a pointer and adds an absolute address of the beginning instruction of the program to the relative address in the program. This allows the loader to patch or relocate the executable image, such that references to addresses in the executable are patched to match the desired address of the relocated executable image.

An encryption mechanism is employed to encrypt parts of the executable program at or after link time. Where link time is the time when files compiled from different source modules are linked into a single program. Decisions made by the linker are constrained by the compiled code and ultimately by the information contained in source code. A fix-up table is then encrypted preventing the image being relocated without decrypting the fix-up table first.

The sections of executable code to be protected are put into special text (and data) sections that are encrypted. All other code and data is left unencrypted. A decryption mechanism is employed to decrypt the encrypted fix-up table and specially encrypted text (and data) sections at load time before the image can be run.

In operation, at compile time, the program source code is complied by a compiler into object code. Sections of the program source code that need to be protected are flagged using a special complier derivative or command in the source code, or by modifying the object code after the source is compiled. Decisions made at compile time are constrained by the amount and kind of information encoded in source files. A compiler directive is a special comment added to a program which allows the compiler to perform certain actions and can include switch directives which turn compiler features on or switches off; parameter directives which specify parameters that affect the compilation and conditional directives which control conditional compilation of parts of the source text.

Compiler directives are non-executable statements which do not get translated directly into executable code.

The fix up table can contain the locations in the executable of data that need to be patched or relocated. The data that needs to be patched is:

1. Program instructions that refer to locations in the program, the locations need to be modified to match the new relocation address. For example, jump addresses, load/store instructions that refer to program addresses in the instruction. The operands in the instruction code need to be modified, e.g. jmp_main load some_table->reg0.

2. Data such as pointers that refer to specific locations in the program. These pointers need to be modified to match the new relocation address. For example, pointers to data structures, or functions need changed to match the new relocation address of the executable.

It is assumed that the executable has been compiled to start at location $0$ in memory. The executable is relocated to a new fixed memory location N. It is therefore necessary to add the offset N to every address reference in the executable to relocate the executable to the starting address N.

First the decrypted program is copied into the new memory address space, starting at address N. The fix up table is then decrypted and processed entry by entry. Each entry contains the location L of instruction or instruction operands and data (such as pointers) in the executable that need to be offset by N. The program code or data at address L+N is then transformed as follows. The contents of location L+N read into variable X such that X is changed by the relocation offset N, that is X=X+N and X is written back into the location, L+N.

This is repeated for all entries in the fix up table. The fix up table is then disposed off, returning it back to the free memory allocator as it no longer required once the fix up is complete.

For example, the Philips TriMedia C compiler allows compiled object code to be renamed whilst using a GNU GCC C compiler permits directives to rename a section in the source code itself. Using a known naming convention, for example, prefixing a section with a character string such as '_encrypt_' can allow the final link stage to determine which sections need encrypting in the final executable image generated by the linker. The invention may be implemented using any appropriate complier and can use any appropriate process to compile the source code into object code as is understood by those skilled in the art.

Figure 1:
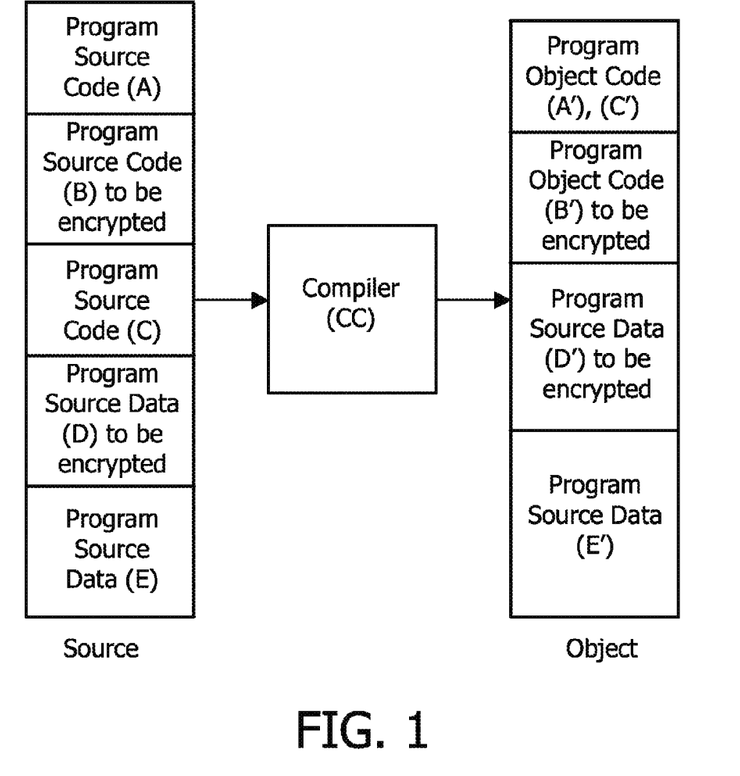
FIG. 1 is a block diagram of a single source file, containing source code portions, text and data portions which can be complied by a compiler.

FIG. 1 illustrates a single source file, containing source code portions A, B, C and text or data portions D, E, which are complied by a C compiler CC. The source code B and the data D is marked by compiler directives in the source code to be encrypted. The resulting object code generated by the compiler contains text and data sections marked to be encrypted B' and D' and normal text and data sections A', C' and E'.

Figure 2:
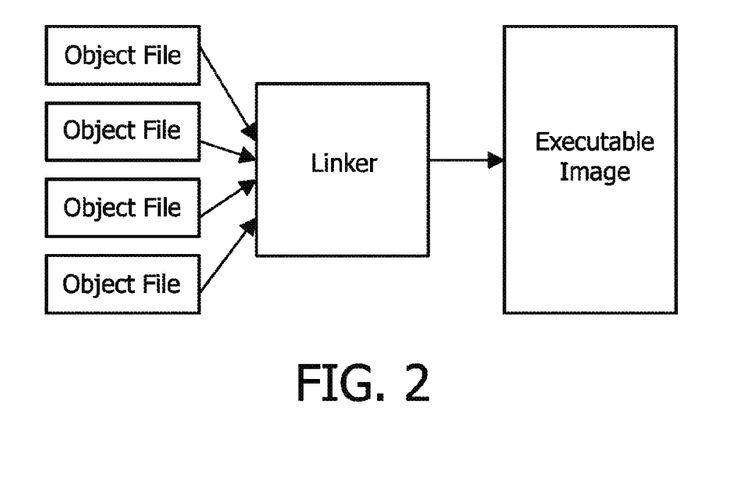
FIG. 2 is a block diagram of object files linked together by a linker to produce a final executable image.

One or more of the object files are then linked together by a linker to produce the final executable image as illustrated in FIG. 2. The executable image contains Text, Data and BSS sections, with some sections being marked for encryption by the compiler directives, as discussed above. The method of marking a section is implementation dependant and based on the nature of the compiler and/or linker.

Figure 3:
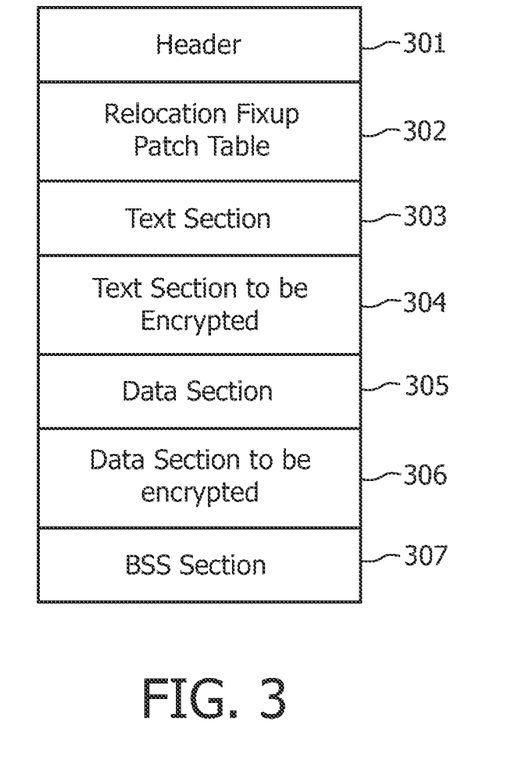
FIG. 3 is a block diagram of final executable image, where the header contains executable format information.

An example of a final executable image is illustrated in FIG. 3, where the header 301 contains executable format information, for example industry standard ELF (Executable and Linking Formats), COFF (Common Object File Formats) or 'a.out' executable image formats. The Relocation Fix-up Patch Table 302 contains information to allow the loader to relocate and patch the executable images so that references to addresses in the executable are patched to point to the new relocated executable addresses. Each ELF file can made up of one ELF header, followed by zero or more segments and zero or more sections. The segments contain information that is necessary for runtime execution of the file. However, the COFF format is preferred since it allows multiple named sections in an object file.

The Text Section 303 contains normal executable program code, whilst the Text Section to be encrypted 304 contains executable code to be protected by encryption. The Data Section 305, contains normal program data whilst the Data Section to be encrypted 306 contains program data to be protected by encryption. The BSS Section 307 contains data to be zeroed at program start up.

Figure 4:
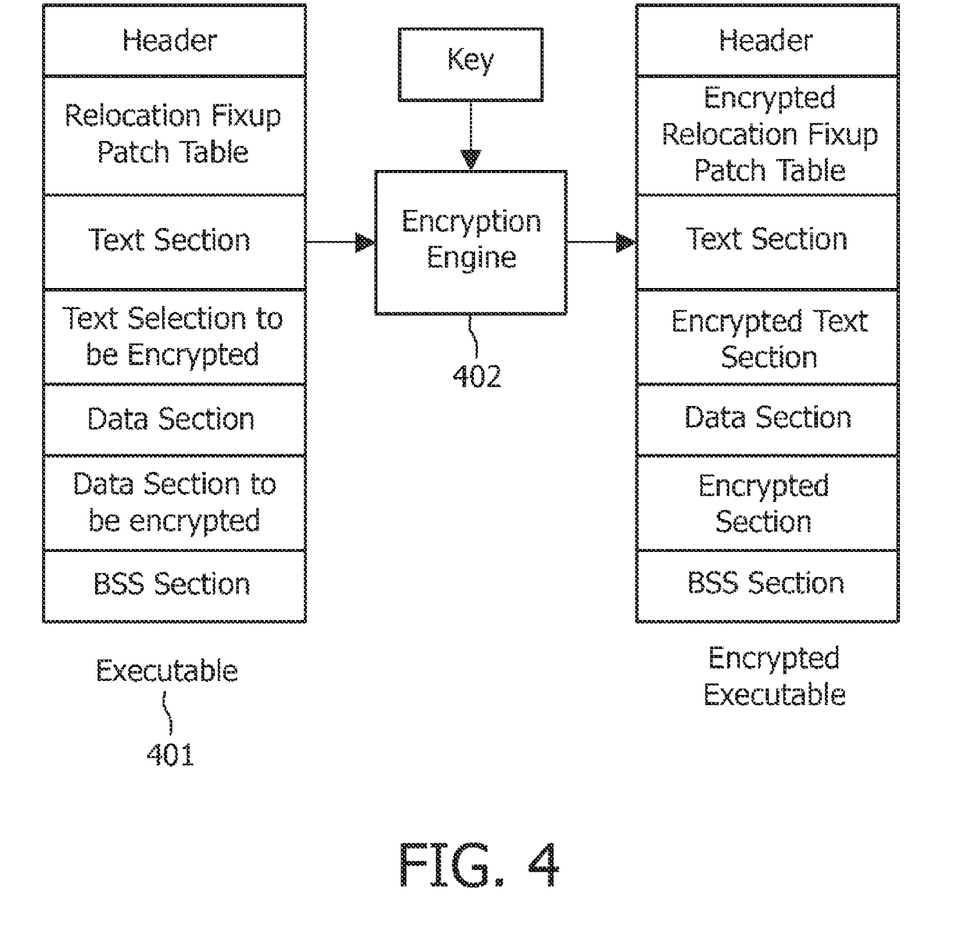
FIG. 4 is a block diagram of an executable image being passed to a post-linker encryption engine.
Figure 5:
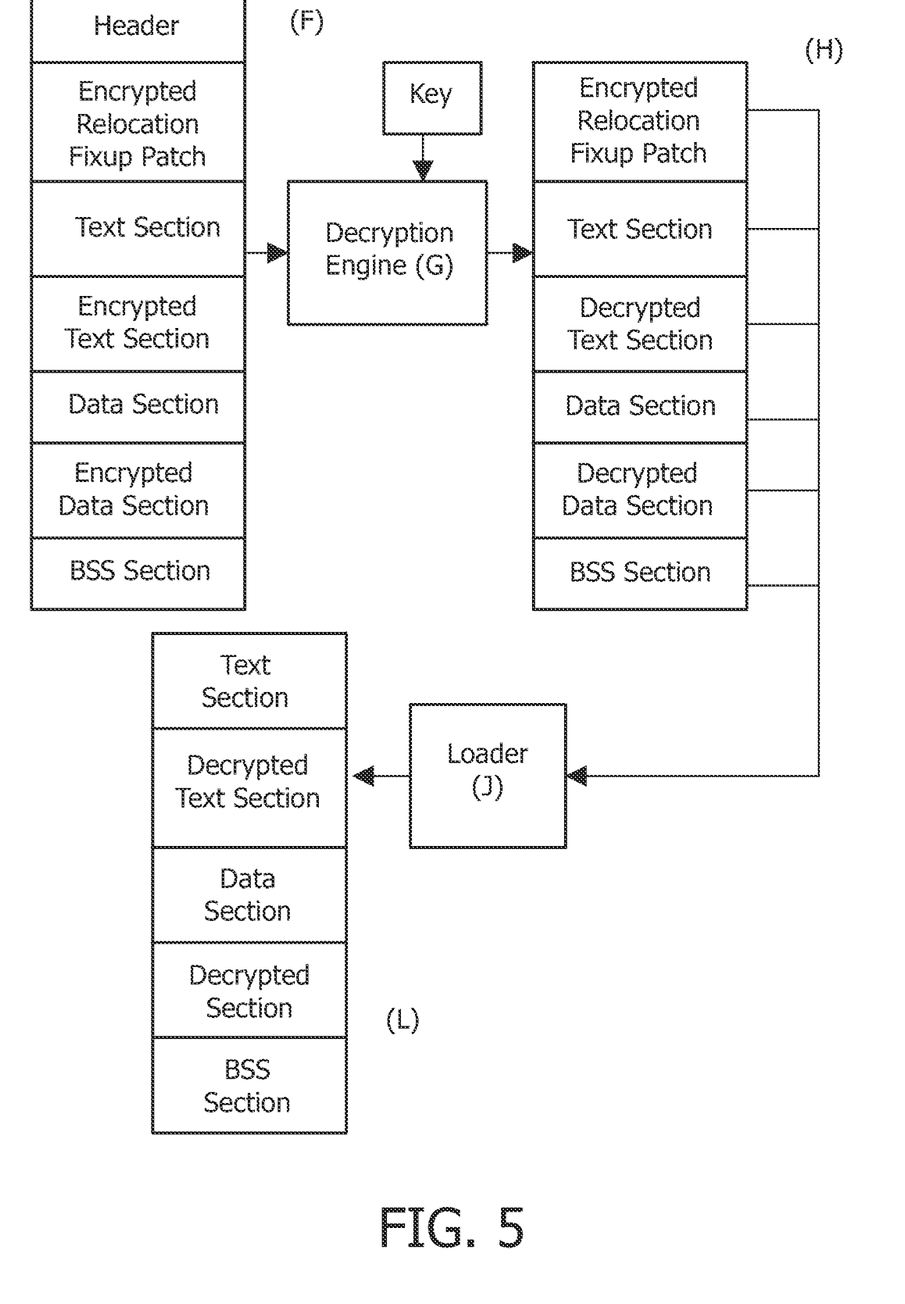
FIG. 5 illustrates in block form decryption, relocation and execution of the executable image at load time.

When the executable image 401 is formed, as illustrated in FIG. 4, it is then passed to a post-linker encryption engine. The encryption engine 402 then reads the executable image and encrypts a Relocation Fix-up Patch Table, and any Text or Data sections marked for encryption. When the image is due to be loaded, at load time, the executable image is decrypted, patched/relocated and executed as illustrated in FIG. 5. Encrypted sections of the executable are decrypted by the decryption engine G to produce an executable image that the loader J can relocate to produce the final run time image L.

The steps of encryption and decryption as mentioned above can implemented by any appropriate means as understood by those skilled in the art. However, to implement the present invention it is necessary that the encryption means is capable of understanding the final output executable object format so that it can process the executable object code and determine the sections that need encrypting. Indeed, the step of linking and producing the final executable image can be combined thereby removing the need for separate means to understand post-linking executable object code to carry out post linking processing and encryption.

Figure 6:
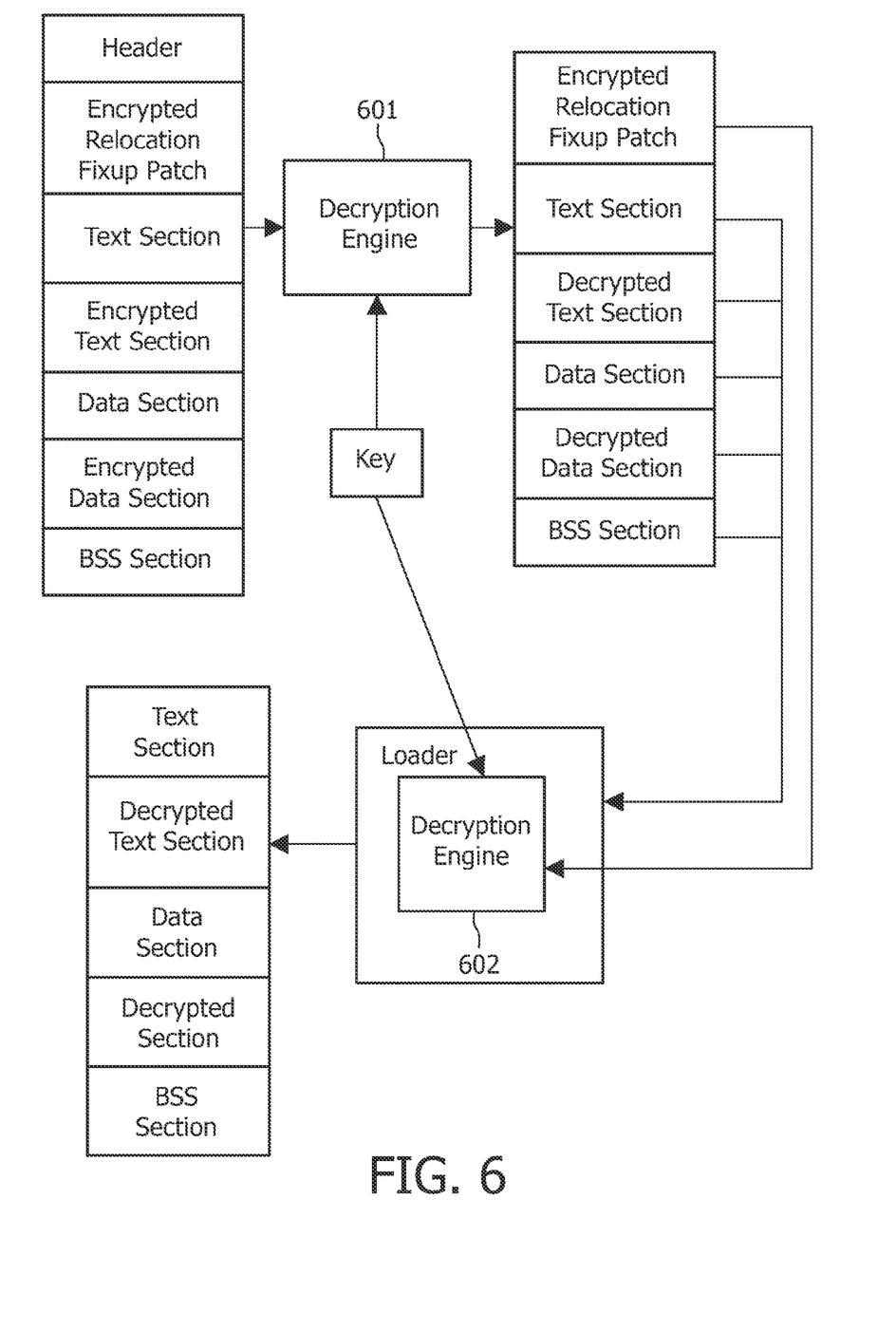
FIG. 6 is a block diagram of a combined loader and decryption engine according to the present invention.

In a further embodiment of invention as illustrated in FIG. 6, the loader can be optimised to include a decryption engine enabling it to read, decrypt and process the decrypted fix-up patch table in one combined operation, thereby removing the need to store the decrypted fix-up before passing it to the loader. The executable image data and text sections are decrypted by the first decryption engine 601. The second decryption engine 602, inside the loader decrypts the fix-up patch table only.

As illustrated in FIG. 6, the decryption of the fix up table is combined with the fix up processing in one distinct step. Decryption of the fix up table will take encrypted fix up table information and decrypt it into decrypted fix up table entries. Once a decrypted fix up table entry is available from the decryption engine it can be used to patch the executable code. This is a saving compared to the separate decrypt and fix up processing phases that have to store the decrypted fix up entry back to the fix up table and then pass this data to the fix up processing which reads the data back.

Therefore, for each fix up entry it is possible to save a write back of decrypted fix up data back to memory and also a read back of decrypted fix up data from memory. This results in considerable saving if the fix up table is large as memory read/write processes are slow compared to processor speed and hence save a lot of memory bandwidth and prevent data cache stalls Also, if the decryption engine and fix up processing code are coupled tightly enough, it is possible to fit the decryption and fix up processing into the processors instruction cache and reduce processing time as a result of keeping the number of instruction cache stalls low. Saving memory bandwidth and reducing processing time in this way, speeds up operation when utilising processors such as the TriMedia which have a small instruction and data cache.

In this way, it can be seen that the present invention provides a faster loading, responsive system having cost effective and simple implementation that prevents illegitimate use of executable files.

The invention claimed is:

1. A method comprising:
flagging sections of source files;
compiling both flagged sections and non-flagged sections of said source files to object files that include flagged sections and non-flagged sections;
linking the object files using a linker to produce a first executable image that includes flagged sections, non-flagged sections, and a relocation fix-up table; and
creating a second executable image that includes encrypted flagged sections, an encrypted relocation fix-up table, and non-encrypted non-flagged sections, wherein said creating includes encrypting the relocation fix-up table and flagged sections of the first executable image based on an encryption key;
loading the second executable image into memory at a base address;
decrypting the encrypted relocation fix-up table of the loaded second executable image based on a decryption key; and
updating memory references of the second executable image based on the decrypted relocation fix-up table and the base address to produce a run time image.

2. The method of claim 1, wherein:
said flagging sections of source files comprises naming said sections at a source level stage; and
said creating a second executable image comprises encrypting flagged sections and the relocation fix-up table using a post-linker encryption engine and the encryption key.

3. The method of claim 1, further comprising:
flagging a header section of the first executable image.

4. The method of claim 3, wherein the flagged header section comprises the relocation fix-up table for the first executable image.

5. The method of claim 1, wherein said encrypting the relocation fix-up table prevents the second executable image from being relocated in memory in a manner that permits execution of the second executable image without decrypting the encrypted relocation fix-up table based on the decryption key.

6. The method of claim 1, wherein said encrypting comprises encrypting flagged sections of the first executable image based on commands in the source files.

7. The method of claim 1, wherein said encrypting comprises encrypting one or more of an executable code section, a data section and a block storage segment section of the first executable image.

8. A method comprising:
flagging sections of source files;
compiling both flagged sections and non-flagged sections of said source files to object files that include flagged sections and non-flagged sections;
linking the object files using a linker to produce a first executable image that includes flagged sections, non-flagged sections, and a relocation fix-up table; and
creating a second executable image that includes encrypted flagged sections, an encrypted relocation fix-up table, and non-encrypted non-flagged sections, wherein said creating includes encrypting the relocation fix-up table and flagged sections of the first executable image based on an encryption key;
wherein said compiling and said linking results in the relocation fix-up table comprising a plurality of entries that permit operatively loading the first executable image to a relocatable address; and
wherein ones of the plurality of entries identify a location in the first executable image to adjust based on the relocatable address to which the first executable image is loaded.

9. The method of claim 8, further comprising decrypting encrypted sections of the second executable image based on a decryption engine and a decryption key to produce a run time image.

10. The method of claim 9, further comprising decrypting the encrypted relocation fix-up table of the second executable image based on a decryption key.

11. The method of claim 10, further comprising:
loading, with a loader, the second executable image into memory at run time;
wherein said loading includes said decrypting encrypted sections and said decrypting the encrypted relocation fix-up table.

12. A system, comprising:
a computer-readable storage device including stored instructions for a compiler, a linker, and an encryption engine; and
a processor configured to execute the stored instructions for the compiler, the linker, and the encryption engine;
wherein the stored instructions for the compiler, in response to being executed, further configure the processor to flag sections of source files, and compile both flagged sections and non-flagged sections of the source files to object files that include flagged sections and non-flagged sections;
wherein the stored instructions for the linker, in response to being executed, further configure the processor to link said object files to produce a first executable image that includes flagged sections, non-flagged sections, and a relocation fix-up table;
wherein the stored instructions for the encryption engine, in response to being executed, further configure the processor to create a second executable image that includes encrypted flagged sections, an encrypted relocation fix-up table, and non-encrypted non-flagged sections by encrypting the relocation fix-up table and the flagged sections of the first executable image based on an encryption key;
wherein the computer-readable storage device further comprises stored instructions for a loader; and
wherein the stored instructions for the loader, in response to being executed, further configure the processor to decrypt the relocation fix-up table while updating memory references based on the relocation fix-up table.

13. The system of claim 12, wherein:
the stored instructions for the compiler, in response to being executed, further configure the processor to flag sections by naming said flagged sections at a source level stage; and
the stored instructions for the encryption engine, in response to being executed, further configure the processor to encrypt the named sections.

14. The system of claim 12, wherein, in response executing the stored instructions for the linker, the processor is configured to flag a header section of the first executable image.

15. The system of claim 14, wherein the flagged header section comprises the fix-up table for the first executable image.

16. The system of claim 12, wherein the stored instructions for the encryption engine further configure the processor to encrypt the flagged sections of the first executable image based on commands in the source files or based on linker flags at a link stage.

17. The system of claim 12, wherein the stored instructions for the encryption engine, in response to being executed, further configure the processor to encrypt one or more of an executable code section, a data section, and a block storage segment section of the first executable image.

18. The system of claim 12, wherein the stored instructions for the linker, in response to being executed, further configure the processor to flag sections of the first executable image based on commands in the source files.

19. The system of claim 12, wherein:
the computer-readable storage device further comprises stored instructions for an encryption engine; and
the stored instructions for the encryption engine, in response to being executed, further configure the processor to decrypt encrypted sections of the second executable image based on a decryption key to produce a run time image.

20. The system of claim 19, wherein the stored instructions for the encryption engine, in response to being executed, further configure the processor to decrypt the encrypted fix-up table of the second executable image based on the decryption engine and the decryption key.

21. The system of claim 12, wherein the stored instructions for the loader, in response to being executed, further configure the processor to load the second executable image into memory, and to decrypt encrypted sections and the encrypted relocation fix-up table based on a decryption key to produce a run time image.

22. The system of claim 12, wherein said flagged sections of the first executable image include an executable program code section, a data section, and a block storage segment section.

23. The system of claim 12, wherein the encrypted relocation fix-up table of the second executable image is configured to prevent the second executable image from being relocated in memory in a manner that permits execution of the second executable image without decrypting the encrypted fix-up table based on the decryption key.

24. The system of claim 12, wherein the encryption engine is a post-linker encryption engine.

25. The method of claim 1, wherein said flagging sections of source files comprises flagging sections based on commands in the source files or based on linker flags at a link stage.

26. A method comprising:
flagging sections of source files;
compiling both flagged sections and non-flagged sections of said source files to object files that include flagged sections and non-flagged sections;
linking the object files using a linker to produce a first executable image that includes flagged sections, non-flagged sections, and a relocation fix-up table; and
creating a second executable image that includes encrypted flagged sections, an encrypted relocation fix-up table, and non-encrypted non-flagged sections, wherein said creating includes encrypting the relocation fix-up table and flagged sections of the first executable image based on an encryption key;
wherein said compiling and said linking results in the relocation fix-up table comprising a plurality of entries that permit operatively loading the first executable image to a relocatable address; and
wherein ones of the plurality of entries identify an operand address of a program instruction in the first executable image to adjust based on the relocatable address to which the first executable image is loaded.

27. A method comprising:
flagging sections of source files;
compiling both flagged sections and non-flagged sections of said source files to object files that include flagged sections and non-flagged sections;
linking the object files using a linker to produce a first executable image that includes flagged sections, non-flagged sections, and a relocation fix-up table; and
creating a second executable image that includes encrypted flagged sections, an encrypted relocation fix-up table, and non-encrypted non-flagged sections, wherein said creating includes encrypting the relocation fix-up table and flagged sections of the first executable image based on an encryption key;
wherein said compiling and said linking results in the relocation fix-up table comprising a plurality of entries that permit operatively loading the first executable image to a relocatable address; and
wherein ones of the plurality of entries identify a data structure pointer to adjust based on the relocatable address to which the first executable image is loaded.

28. A method comprising:
flagging sections of source files;
compiling both flagged sections and non-flagged sections of said source files to object files that include flagged sections and non-flagged sections;
linking the object files using a linker to produce a first executable image that includes flagged sections, non-flagged sections, and a relocation fix-up table; and
creating a second executable image that includes encrypted flagged sections, an encrypted relocation fix-up table, and non-encrypted non-flagged sections, wherein said creating includes encrypting the relocation fix-up table and flagged sections of the first executable image based on an encryption key;
wherein said compiling and said linking results in the relocation fix-up table comprising a plurality of entries that permit operatively loading the first executable image to a relocatable address; and
wherein ones of the plurality of entries identify a function pointer to adjust based on the relocatable address to which the first executable image is loaded.

29. The method of claim 26, wherein:
said flagging sections of source files comprises naming said sections at a source level stage; and
said creating a second executable image comprises encrypting flagged sections and the relocation fix-up table using a post-linker encryption engine and the encryption key.

30. The method of claim 27, wherein:
said flagging sections of source files comprises naming said sections at a source level stage; and
said creating a second executable image comprises encrypting flagged sections and the relocation fix-up table using a post-linker encryption engine and the encryption key.

* * * * *

UNITED STATES PATENT AND TRADEMARK OFFICE
CERTIFICATE OF CORRECTION

PATENT NO.        : 8,745,406 B2
APPLICATION NO.   : 12/090028
DATED             : June 3, 2014
INVENTOR(S)       : Colin King Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1423 days.

Signed and Sealed this
Twenty-ninth Day of September, 2015

Michelle K. Lee
*Director of the United States Patent and Trademark Office*